Dec. 20, 1932.  H. A. MEYER  1,891,237
AIRCRAFT CONTROL
Filed Oct. 13, 1931   3 Sheets-Sheet 1

H. A. MEYER  INVENTOR.
BY
Merrill M. Blackburn
ATTORNEY.

H. A. MEYER INVENTOR.

BY Merrill M. Blackburn.
ATTORNEY.

Dec. 20, 1932.   H. A. MEYER   1,891,237
AIRCRAFT CONTROL
Filed Oct. 13, 1931   3 Sheets-Sheet 3

H. A. MEYER   INVENTOR.
BY
Merrill M. Blackburn.
ATTORNEY.

Patented Dec. 20, 1932

1,891,237

UNITED STATES PATENT OFFICE

HENRY ANTON MEYER, OF ST. PAUL, MINNESOTA

AIRCRAFT CONTROL

Application filed October 13, 1931. Serial No. 568,569.

The present invention relates to aircraft and more particularly to the propulsion and steering thereof. Among the objects of this invention are to provide improved means for propelling aircraft; to provide improved means which will simultaneously propel and guide such apparatus; to provide an aircraft having power plants and propellers which may be adjusted to exert a driving force in any direction; and such further objects, advantages and capabilities as will hereafter appear and as are inherent in the construction disclosed herein. My invention further resides in the combination, construction and arrangement of parts illustrated in the accompanying drawings and, while I have shown therein what is now considered the preferred embodiment of this invention, I desire the same to be understood as illustrative only and not to be interpreted in a limiting sense.

In the drawings annexed hereto and forming a part hereof,

Fig. 1A is a similar view of a somewhat modified construction with a portion of one end broken away;

Figure 1:
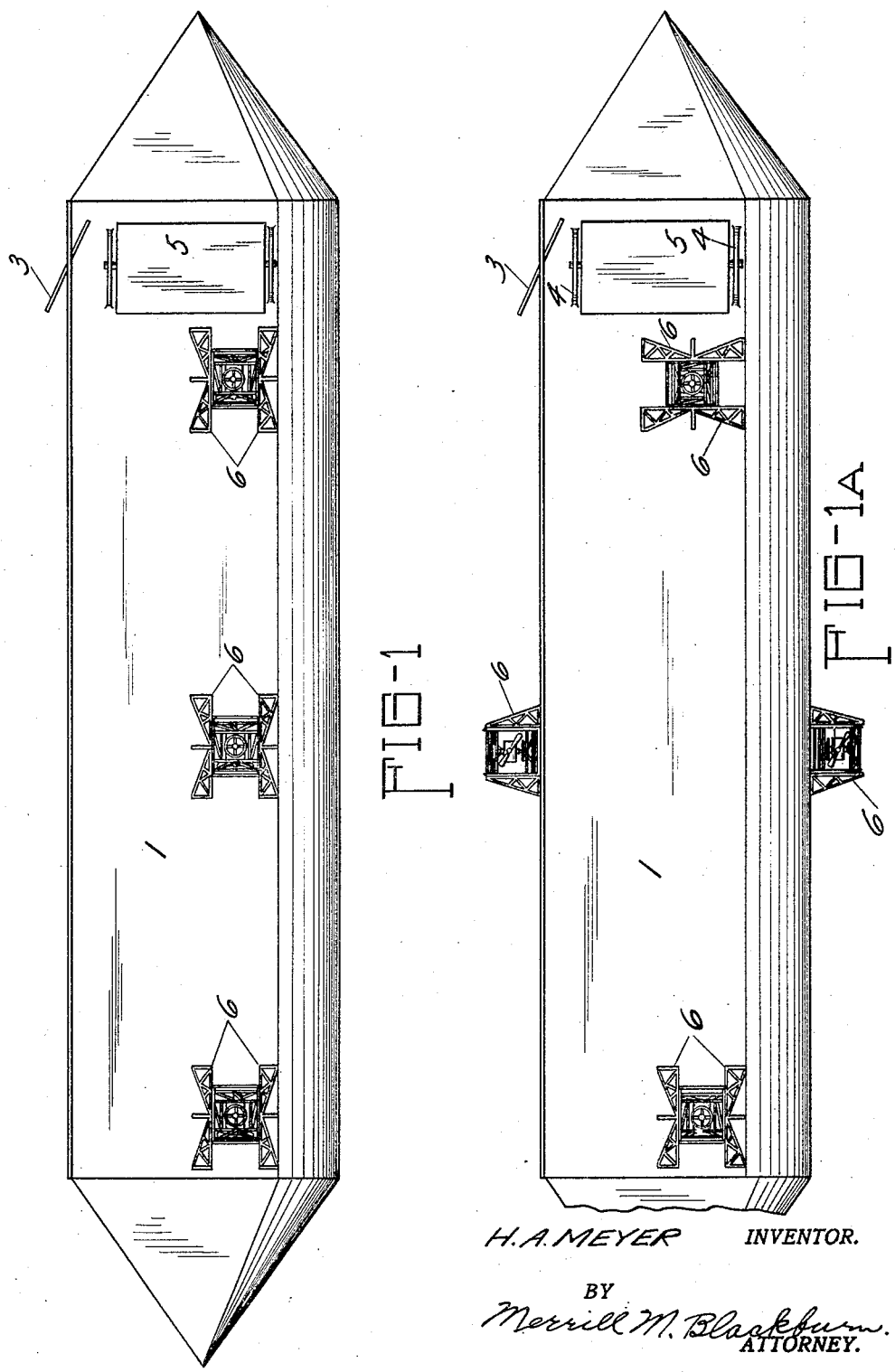
Fig. 1 is a side elevation of a dirigible aircraft embodying some of the features of the present invention.

Reference will now be made in greater detail to the annexed drawings for a more complete description of my invention. The gas bag 1 may be of any suitable form but is illustrated as having flat top and sides and a curved bottom and as being provided with tapered ends for the reduction of air resistance. A plane 2 is mounted at the top of the gas bag and extends equal distances laterally from the two sides thereof. Openings are formed in these lateral projections, preferably near the rear end thereof and in these openings are mounted suitable vanes 3 by means of which, during forward or reverse travel of the dirigible, the rear end thereof may be raised or lowered with respect to the forward end. It will of course be understood that the vanes 3 may be inclined with their forward edges directed either upwardly, as shown in the drawings, or downwardly, as desired.

Extending laterally from the bag 1 are supports 4 which carry guiding elements 5 for steering the aircraft to right or left. It will be understood that this structure is shown more or less diagrammatically and that no means has been illustrated whereby these devices may be turned upon their pivots. It is not considered necessary to make a complete disclosure of this construction inasmuch as claims thereto would be required to be divided from claims to the power plants and their arrangement with reference to the bag.

Figure 2:
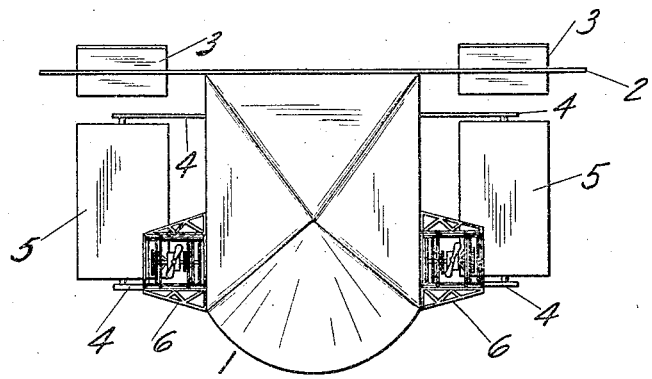
Fig. 2 is a front end view of the structure shown in Fig. 1.
Figure 3:
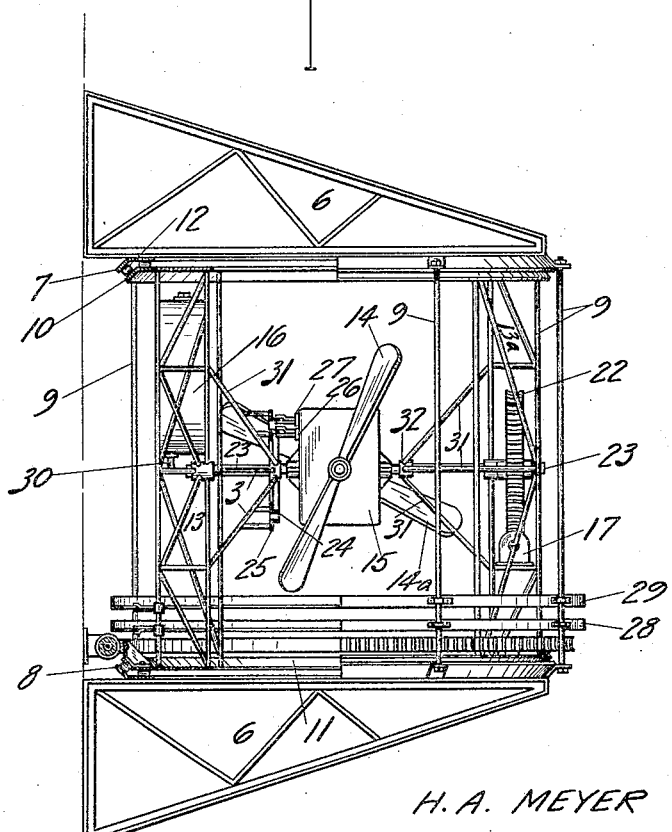
Fig. 3 is a sectional elevation taken substantially along the plane indicated by the broken line 3—3, Fig. 4.
Figure 4:
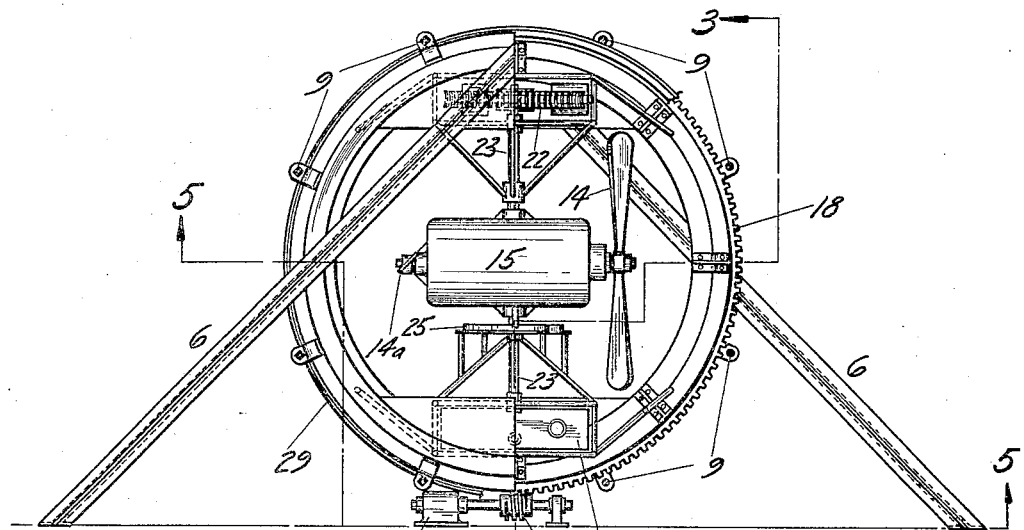
Fig. 4 is a sectional plan view taken substantially along the plane indicated by the line 4—4, Fig. 5.
Figure 5:
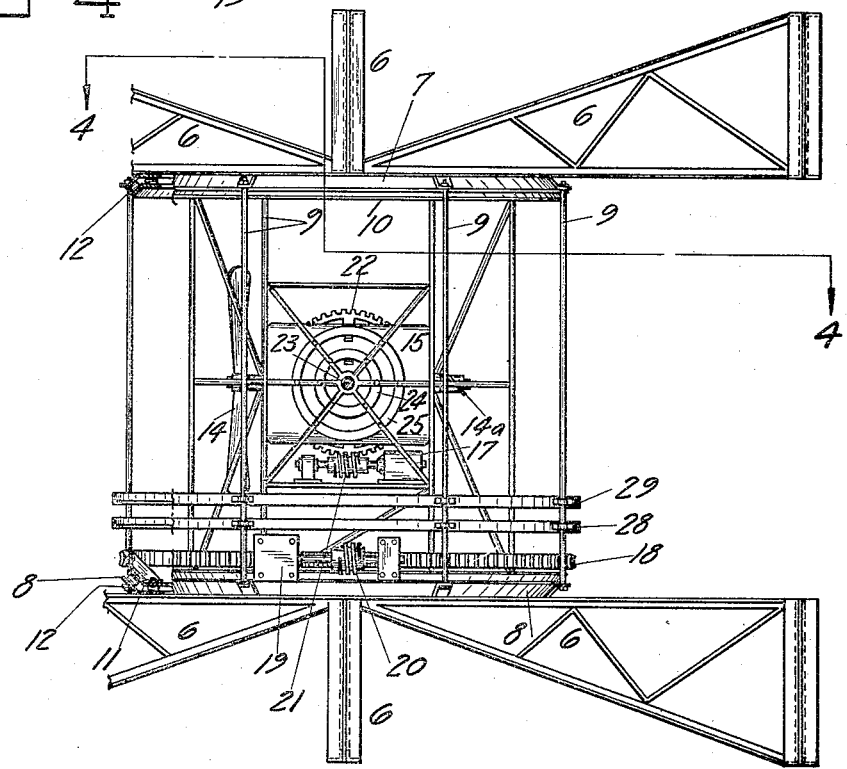
Fig. 5 is a sectional elevation taken substantially along the broken line 5—5, Fig. 4, looking at one of the power plants from the side adjacent the gas bag.

Reference will now be made to the power plant units and their mounting upon bag. Suitable framework 6 is provided for the mounting of the engines, fuel tanks and propellers, said framework being connected in any suitable way to the structural framework of the dirgible. In Figs. 1 and 2, the power plants are all shown as being located upon the two opposite sides of the bag, adjacent the bottom thereof. In Fig. 1A, the two central power plants are illustrated as having been moved from the sides to the top and bottom, respectively. Also, it is shown that these cages or frameworks may occupy different positions relatively to the longitudinal direction of the bag.

It should possibly be remarked that no attempt has been made to show any means for mooring the bag, any windows opening to the passenger compartments within the bag or any means of ingress or egress. These things are well known in this art and it is therefore not considered necessary to show them.

The supporting elements 6 serve as means for mounting cages upon the gas bag and the structure of this apparatus will now be described with more particular reference to sheets 2 and 3. The cooperating elements 6 have outer tables or runways 7 and 8 which are connected by stay rods 9. Within the runways 7 and 8 are inner runways 10 and 11 and between the respective inner and outer runways are suitable anti-friction means 12, such as rollers or balls. Rigidly secured to the inner runways are frames 13 and 13a which carry the moving parts, among which are the propellers 14 and 14a, the motor for driving same, 15, the gasoline tank 16 and the electric motor 17 for tilting the internal combustion engine and the propellers.

A worm wheel 18 is mounted on the inside of the cage formed by the stay rods 9 and is rigidly connected to the movable structure within the same. A reversible electric motor 19 has a worm 20 upon its shaft which meshes with the teeth of the worm wheel 18. Therefore, when the rotor of the motor 19 is rotated in one direction or the other, the worm 20 and, consequently, the worm wheel 18 will be rotated to cause steering of the aircraft to the right or left, according to the arrangement of Fig. 1. It will of course be understood that if the direction of the cage is changed, as in Fig. 1A, the effect upon the position of the internal combustion engine and the propellers will be varied and, consequently, the effect upon the course of the ship.

A worm 21 upon the shaft of electric motor 17 meshes with a worm wheel 22 rigidly connected with shaft 23 which extends through the cage and supports the motor 15. The motors 17 and 19 should both be reversible so that it will be possible to rotate the movable cage in either direction or tilt the engine in either direction so as to have proper control of the aircraft. These motors are preferably operated by means of storage batteries located within the body of the craft. Contact rings 24 and 25 cooperate with contacts 26 and 27 in carrying the needed current to the engine 15, while contact rings 28 and 29 supply current to the motor 17. Since the motor 19 is fixed with relation to the framework of the craft, it is obvious that no contact rings are needed for this as the conductors can go directly from the bag to the motor, a suitable pole changing device being employed for causing reversal of the motor. It would, of course, be preferable to provide the craft with a starter for the motor and with means for charging the batteries, as is customary with automobiles.

Gasoline is carried from the tank 16 through a flexible connection 30 and the shaft 23 to the carburetor and from there to the engine 15. Inasmuch as it may be desired to file a separate application upon this construction, the details thereof are not disclosed in the present application. The shaft 23 is braced by a plurality of rods 31 connecting the bearings 32 to the cage. The shaft 23 is provided at each end with a plurality of bearings so as to furnish a sufficient support for the motor.

It is thought that the operation of this construction will be evident without its being explained in detail but a brief statement thereof will nevertheless be given. Assuming that the dirigible is slightly heavier than the air and is resting upon the ground and assuming, also, that it is desired to rise, the motors 17 may be operated to turn the shafts of the forward motors (or all of the motors) 15 so that the propellers 14 and 14a will exert a lifting influence. These motors are then started and the aircraft begins to rise. When a sufficient altitude is attained, the rear motors 17 may be operated to turn the gears 22 and shafts 23 so that the propellers 14 and 14a will exert a propulsive force to cause the craft to advance. When the craft is in the air and travelling normally, shafts 23 will be turned so as to give the propeller shafts the proper inclination to keep the ship sailing at approximately the proper altitude. However, the vanes 3 may be used to assist the motors in guiding the ship in the intended course. Also, the vanes 5 will be manipulated to steer the craft to right or left as may be desired. Of course this action can be assisted by proper control of the propellers, thus enabling the ship to turn about in a comparatively small space.

It will of course be understood that the specific description of structure set forth herein may be departed from without departing from the spirit of my invention as set forth in this specification and the appended claims.

Having now described my invention, I claim:

1. In a structure of the character described, supports extending laterally from the body of the aircraft, tracks carried by said supports and arranged in substantially parallel planes, rods connecting said tracks to hold them a definite distance apart, a cage having tracks upon its ends adjacent and parallel with the first mentioned tracks, anti-friction means separating the tracks, a framework connecting the second mentioned tracks and rotatable therewith, a shaft in the second mentioned framework and rotatable about an axis at a right angle to the axis of rotation of the cage, a motor carried by said shaft to rotate therewith and means to rotate the cage and the shaft about their respective axes.

2. Propulsion mechanism for aircraft, comprising supporting means to be supported on the craft, a cage rotatably carried by the supporting means, a frame entirely within and supported by the cage, propelling means supported by the frame and rotatable about an axis substantially at a right angle to the direction of the axis of rotation of the cage.

3. A structure as defined by claim 2 in which the frame is carried and rotates with the cage and the propelling means rotates in a direction substantially at a right angle to the direction of rotation of the cage.

In witness whereof, I hereunto subscribe my name to this specification.

HENRY ANTON MEYER.